Patented Sept. 7, 1954

2,688,540

UNITED STATES PATENT OFFICE 2,688,540

PROCESS FOR COLOR PHOTOGRAPHY

Karl Otto Ganguin and Eric Macdonald, Blackley, Manchester, England, assignors to Imperial Chemical Industries Limited, a corporation of Great Britain No Drawing. Application November 13, 1951, Serial No. 256,126

Claims priority, application Great Britain November 20, 1950

9 Claims. (Cl. 95—2)

This invention relates to a process for colour photography and more particularly to a process for colour correction in colour photography.

The dyestuffs and pigments used in practice in subtractive processes of colour photography do not possess ideal spectral absorption curves. In addition to absorbing light in the desired part of the spectrum, they also absorb some light in other parts of the spectrum and as a result of this the colour reproduction is never ideal. For example, magenta dyestuffs formed by colour development from colour formers of the pyrazolone series absorb the desired complementary coloured green light and in addition absorb undesirably a certain amount of blue light. It has been proposed (see for example The Journal of the Photographic Society of America, volume 13, 94-96, February 1947) to correct for these deficiencies by the use of an automatic masking method whereby coloured colour formers are used, the light absorption of the colour former being equal or approximately equal to the undesired light absorption of the developed dyestuff. For example the colour former which is used in a photographic layer to form a magenta dyestuff on colour development may itself be coloured yellow so that it absorbs blue light at an intensity equal to the undesired blue absorption of the magenta dyestuff former by colour development. Accordingly the unchanged colour former itself forms the coloured mask and the blue absorption of the photographic layer is a constant value (irrespective of the green absorption of the magenta image) which can be compensated for by using a suitable filter when printing.

The coloured colour formers it has been proposed to use in the above process are compounds containing the group —N=N—R where R is an aromatic or heterocyclic radical. The —N=N—R group is split off during the development with an aromatic amino compound and replaced by the phenylimino radical derived from the aromatic amino compound.

The main practical objection to the use of the coloured colour formers hitherto known for use in this automatic masking method is that the reaction of such colour formers with the primary aromatic amino compounds used for development is undesirably slow.

In British specification No. 513,596 it has been proposed to produce coloured photographic images by developing a reducible silver salt image with an aromatic compound as the developer, and in the presence of a colour former which is the condensation product of an aldehyde or a ketone with a pyrazole-5-one having a reactive methylene group in the 4-position and in which the 1 and 3 positions may or may not be substituted, the condensation linkage occurring in the said methylene group, and said condensation product containing one nucleus of the pyrazole-5-one or the most two such nuclei. The substituents in the 1 and 3 positions may be for example aryl or higher alkyl groups, and among the colour formers mentioned is 1-phenyl-3-methyl-4-p-dimethylamino - benzal - 5-pyrazolone. It is said that the colour former can be incorporated in the emulsion, but there is no suggestion in the specification that the residual colour former could be used for masking purposes. Also none of the colour formers mentioned in the British specification No. 513,596 contain sulphonic or carboxylic acid groups, and it is clear that colour formers containing such groups were not intended to be used in the process, since it is said in the specification that the derivatives of the pyrazole-5-ones to be used in accordance with the invention are more suitable than the pyrazole-5-ones from which they are derived, as they are less soluble and when incorporated in the emulsion do not have as great a tendency to diffuse from one emulsion layer to another emulsion layer, or to dissolve in the developer.

In the specification of our U. S. application Serial No. 172,998 we have described the use as coloured colour formers of water-soluble yellow styryl dyestuffs containing a sulphonic or carboxylic acid group, a substituent which renders the dyestuff fast to diffusion in gelatin emulsions, and the grouping.

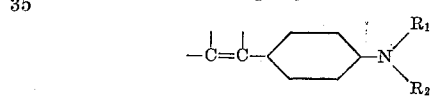

wherein the benzene nucleus may be substituted, wherein the terminal carbon atom is the omega-carbon atom of a cyanoacetyl radical or forms part of a heterocyclic nucleus, and wherein at least one of the radicals $R_1$ and $R_2$ is an alkyl radical substituted with for example, —CN, —COOAlkyl, —NO$_2$, carboxyl or sulphonic acid groups, and, when only one of the radicals $R_1$ and $R_2$ is an alkyl radical so substituted, the other radical is a substituted or unsubstituted hydrocarbon radical.

These styryl dyestuffs are obtainable by condensing an anil of a p-substituted-amino-benzaldehyde with a reactive methylene compound of the kind used for forming magenta dyestuffs in colour photography by reaction with colour developers.

We have now found that when such a yellow styryl dyestuff, and preferably one formed from a water-insoluble p-substituted amino-benzaldehyde, is used in a photographic film as a coloured colour former and also to form the masking image, the intensity of the masking image can be controlled and its absorption characteristics and permanence can be improved, if the film, after colour development, is treated with a substance which is capable of decomposing the p-substituted-amino-benzylidene derivative of the aromatic amine used for colour development, and liberating the said p-substituted-amino-benzaldehyde therefrom.

According to our invention therefore we provide an improved process for colour correction in colour photography which comprises developing with an aromatic amine as colour developer, an exposed multilayer photographic material comprising 3 differently sensitised gelatino-silver halide emulsion layers, one such layer containing a yellow, one a magenta and the other a cyan colour former, wherein the magenta colour former is a water-soluble yellow styryl dyestuff which contains a substituent rendering the compound fast to diffusion and which is derived from a p-N-substituted-amino-benzaldehyde and a reactive methylene compound, and subsequently treating the photographic material with a substance capable of liberating the p-N-substituted-amino-benzaldehyde from the p-N-substituted-amino-benzylidene derivative of the aromatic amine used as colour developer.

By a substituent rendering the compound fast to diffusion, we mean any substituent which is known from the literature to reduce substantially or suppress the diffusion of colour former or dyestuff in the emulsion layer, for example an alkyl radical with a carbon chain of at least 5 carbon atoms.

As examples of compounds which the capable of liberating the said aldehyde from the said anil, there may be mentioned formaldehyde and nitrites, for example sodium or other alkali metal nitrite. The suitability of any compound for this purpose can be ascertained by the following simple test. A strip of film base is coated with a gelatin emulsion containing 12 gms. per litre of the yellow styryl dyestuff. The film is dried and immersed in a developer solution of the following composition:

| | Parts |
|---|---|
| p-N:N-diethylaminoaniline hydrochloride | 3 |
| Sodium sulphite, anhydrous | 1 |
| Sodium carbonate, anhydrous | 60 |
| Potassium bromide | 2 |
| Water to make up to | 1000 |

When the yellow colour is removed the film is washed and introduced into a solution of the substance to be tested. The substance is suitable for use if the yellow colour is restored.

As a possible explanation of the mechanism of the process of our invention, it is suggested that in the counter-imagewise portions of the layer containing the yellow styryl dyestuff, the aromatic amine used as colour developer reacts with at least part of the yellow styryl dyestuff to form (1) the parent reactive methylene compound and (2) the anil derived from the p-N-substituted-amino-benzaldehyde and the aromatic amine used as colour developer. Some small amount of styryl dyestuff may be reformed during the subsequent processing steps but by the action of, for example, formaldehyde or sodium nitrite, the p-N-substituted-amino-benzaldehyde is liberated from the anil and the said aldehyde then reacts with the reactive methylene compound to reform sufficient styryl dyestuff to form an effective colour correction masking image in the counter-imagewise portions of the layer. When the aldehyde portion of the styryl dyestuff molecule is free from solubilising groups and the reactive methylene compound is non-diffusible, then substantially all the original styryl dyestuff will be reformed in the counter-imagewise portions of the layer.

The styryl deystuffs used as colour formers may be prepared by reacting the anils of p-N-substituted amino-benzaldehydes with reactive methylene compounds of, for example, the pyrazolone series or the cyanoacetyl series.

Specific examples of suitable reactive methylene compounds are 1-(4'-phenoxy-3'-sulphophenyl)-3-heptadecyl-5-pyrazolone, 1-(phenyl-3'-methanesulphonic acid)-3-heptadecyl-5-pyrazolone, and the compound obtained by acylating 4-omega-cyanoacetoaniline with octadecenylsuccinic anhydride.

Examples of suitable p-substituted amino-benzaldehyde are p-(N-methyl-N-β-hydroxyethylamino)-benzaldehyde, p-(N-ethyl-N-β-hydroxyethylamino)-benzaldehyde, p-(β:β'-dihydroxydiethylamino)-benzaldehyde, p-(N-methyl-N-methoxyethylamino)-benzaldehyde, p-(N-ethyl-N-methoxyethylamino)-benzaldehyde, p-(N-butyl-N-β-hydroxyethylamino)-benzaldehyde, p-(N-methyl-N-β-chlorethylamino)-benzaldehyde, p-(N-ethyl-N-β-chloroethylamino)-benzaldehyde, p-(β:β'-dichlorodiethylamino)-benzaldehyde, 4-(β:β'-dichlorodiethylamino)-2-methylbenzaldehyde, p-(N-methyl-N-β-cyanoethylamino)-benzaldehyde, p-(β:β'-dicyanodiethylamino)-benzaldehyde and p-di-(ethylcarboxymethyl)-amino-benzaldehyde.

The n-cyanoalkyl or N-dicyanodialkyl-substituted p-aminobenzaldehyde may be made by treating the corresponding hydroxyalkyl or dihydroxydialkyl anilines with phosphorus pentabromide, treating the corresponding bromoalkyl or dibromodialkyl compounds so obtained with potassium cyanide, and introducing the aldehyde group by reaction with phosphorus oxychloride and N-methylformanilide and subsequent hydrolysis, that is to say by the methods of Vilsmeier and Haack. (Berichte, volume 60, page 119.)

The aldehyde may be converted to the corresponding anil by condensing it with aniline or a substituted aniline, for example aniline sulphonic acid and the reaction of the anil with the reactive methylene compound may be effected by mixing the reagents together in weakly alkaline aqueous medium, or by heating in methanol with a catalyst such as piperidine of triethylamine.

The process of our invention may be used with a multilayer photographic material wherein the top layer is blue sensitive (that is not spectrally sensitised) and contains a yellow colour former, either of the two lowest layers is green sensitive and the other is red sensitive, either of the two lowest layers contains as magenta colour former the yellow styryl dyestuff and the other contains a cyan colour former and wherein there is a yellow filter layer between the top layer and the 2 lowest layers. The yellow filter layer may contain a gelatin emulsion of colloidal silver. If desired the filter layer may contain instead of colloidal silver a yellow styryl dyestuff which contains a water-soluble group in the aldehyde part of the molecule. In the latter case, the styryl dyestuff used as colour former in the magenta layer should be free from solubilising groups in the aldehyde part of the molecule, and after colour development and treatment in the stopbath, the film may if desired be treated with, for example, hydrazine (which may be introduced into the fixing bath) to complete the discharge of the filter dyestuff, and washed to remove one or more of the decomposition products of the filter dyestuff before the treatment with, for example, formaldehyde or sodium nitrite to regenerate the styryl dyestuff masking image in the magenta layer.

The styryl dyestuffs which may be used in the filter layer may be derived from the soluble non-diffusible reactive methylene compounds of the pyrazolone or cynanoacetyl series indicated above, and a water-soluble or alkali soluble aldehyde for example p-(N-methyl - N - sulphoethyl - amino) - benzaldehyde, p-(N:N-$\beta$:$\beta'$-disulphodiethylamino)-benzaldehyde, 4-(N:N-$\beta$:$\beta'$-disulphodiethylamino)-2-methyl-benzaldehyde, p-(N-methyl-N-carboxyethyl - amino) - benzaldehyde, p - (N:N-$\beta$:$\beta'$ - dicarboxydiethyl-amino) - benzaldehyde, p - N:N - di - (carboxymethyl) - amino - benzaldehyde, p - (N - $\beta$ - sulphoethyl - amino) - benzaldehyde, 4 - (N - N - dimethylamino) - 2 - sulphobenzaldehyde, 4 - (N:N - $\beta$:$\beta'$ - dichlorodiethylamino)-2-sulpho-benzaldehyde.

p-N:N - di - (carboxymethyl) - amino - benzaldehyde may be made by introducing the aldehyde group into di-(ethylcarboxymethyl)-aniline by the method of Vilsmeier and Haack and then hydrolysing the diester to the free acid. The other mono- or di-(carboxyalkyl) derivative may be made by hydrolysis of the appropriate cyanoalkyl compounds. The mono- and di-(sulphoalkyl) derivatives may be made by the action of sodium sulphite on the corresponding chloroalkyl compounds.

The process of our invention may also be used for photographic material wherein the sensitive layer containing the yellow styryl dyestuff derived from an insoluble aldehyde as colour former, is the middle sensitive layer and the yellow styryl dyestuff derived from a soluble aldehyde and used as the yellow filter dyestuff is incorporated in this sensitive layer instead of in a separate filter layer. Such a film may be processed in a manner similar to that used for a film containing the yellow styryl filter dyestuff in a separate layer.

The invention is illustrated but not limited by the following examples in which the parts are by weight:

Example 1

A multilayer light sensitive photographic material is made up as follows:

A red sensitive gelatino-silver halide emulsion layer containing 10 grams per litre of the sodium salt of the cyan colour forming component, obtained by condensing 1-hydroxy-2-napthoic acid chloride with oleyamine and sulphonating (that is the colour forming component described in Example 10 of British specification No. 465,823) is coated on a transparent support and on this layer there is coated a green sensitive gelatino-silver halide emulsion layer containing 12 grams per litre of the yellow styryl dyestuff 1-(4'-phenoxy-3'-sulphophenyl) -3-heptadecyl-4-p-$\beta$:$\beta'$-dicyanodiethylamino-benzylidene - 5 - pyrazolone (sodium salt), to act both as the magenta colour forming component and also as the yellow masking dyestuff. A layer of colloidal silver in gelatin is now coated on to act as yellow filter layer and finally as top layer a blue sensitive gelatino-silver halide emulsion containing 10 grams per litre of p-stearylamino-benzoylacetanilide-p-carboxylic acid sodium salt (the yellow colour forming component described in Example 3 of British specification No. 486,848). The film is exposed to the light from a coloured object and then developed in a solution of the following composition:

| | Parts |
|---|---|
| p-N:N-diethylamino aniline hydrochloride | 3 |
| Sodium sulphite, anhydrous | 1 |
| Sodium carbonate, anhydrous | 60 |
| Potassium bromide | 2 |
| Water to make up to | 1000 |

After development the film is rinsed and transferred into a stop bath of the following composition:

| | Parts |
|---|---|
| Acetic acid glacial | 15 |
| Sodium acetate | 30 |
| 37% formaldehyde solution | 30 |
| Water to make up to | 1000 |

The film is washed and transferred to a bleaching bath solution of the following composition:

| | Parts |
|---|---|
| Potassium ferricyanide | 100 |
| Potassium bromide | 25 |
| Sodium dihydrogen phosphate | 50 |
| Water to make up to | 1000 |

The film is further washed, fixed in a 20% aqueous solution of sodium thiosulphate, finally washed and dried.

This processed material contains in the first layer a cyan dyestuff negative image, in the second layer a magenta dyestuff negative image and a yellow styryl dyestuff positive image, which serves as a mask to correct for the undesirable absorption of blue light by the magenta dyestuff, and in the top layer a yellow dyestuff negative image. When the negative transparency so obtained is used for making positive prints, duplicate negatives or separation negatives, the colour rendering is greatly improved compared with reproduction from negative transparencies which have not been masked, or with reproduction from negative transparencies made as described but without the formaldehyde treatment.

Example 2

A multilayer light sensitive photographic material is made up as described in Example 1 except that in place of the colloidal silver filter layer there is used as the filter layer a gelatin solution containing 15 grams per litre of the styryl dyestuff 1-$\beta$-octadecenyl-succinamido-4-omega-cyano-omega-(p-N:N-di-(carboxyethyl)-amino-benzylidene)-acetobenzene, sodium salt made by condensing p-($\beta$:$\beta'$-dicarboxydiethylamino)-benzaldehyde-anil with 1-$\beta$-octadecenyl-succinamido - 4 - omega - cyanoacetobenzene in the presence of piperidine.

The film is exposed to the light from a coloured object and then developed in a solution of the following composition:

| | Parts |
|---|---|
| 5-diethylamino-2-aminotoluene hydrochloride | 2.5 |
| Sodium sulphite, anhydrous | 2 |
| Hydroxylamine hydrochloride | 1 |
| Sodium carbonate, anhydrous | 60 |
| Potassium bromide | 2 |
| Water to make up to | 1000 |

The film is rinsed and transferred to a stop bath of the following composition:

| | Parts |
|---|---|
| Acetic acid, glacial | 15 |
| Sodium acetate | 25 |
| Water to make up to | 1000 |

The material is washed and the developed silver is bleached in the bleaching bath solution of the composition used in Example 1. The film is washed again and transferred to a solution of the following composition which serves both as a fixing bath for the silver halide and also as a bath for discharging the styryl dyestuffs:

| | Parts |
|---|---|
| Sodium thiosulphate | 200 |
| 50% hydrazine hydrate solution | 50 |
| Water to make up to | 1000 |

The film is washed again to remove the soluble decomposition products of the filter layer dyestuff, and it is then treated with the following solution:

| | Parts |
|---|---|
| 37% formaldehyde solution | 30 |
| Water to make up to | 1000 |

This treatment regenerates the styryl dyestuff in the counter-imagewise portions of the middle sensitive emulsion layer.

The film is finally washed and dried.

This processed film contains in the first layer a cyan dyestuff negative image, in the second layer a magenta dyestuff negative image and a yellow styryl dyestuff positive image, the third layer is a clear gelatin layer and the top layer contains a yellow dyestuff negative image. When the negative transparency so obtained is used for making positive prints, dulicate negatives or separation negatives, the colour rendering is much improved as compared with that from an uncorrected negative or with a negative prepared as described above but without the formaldehyde treatment.

*Example 3*

A multilayer light sensitive photographic material is made up as follows:

A red sensitive gelatino-silver halide emulsion layer containing 10 grams per litre of the sodium salt of the cyan colour forming component obtained by condensing 1 - hydroxy - 2 - naphthoic acid chloride with oleylamine and sulphonating (that is the colour forming component described in Example 10 of British specification No. 465,823) is coated on a transparent support and on this layer there is coated a green sensitive gelatino-silver halide emulsion layer containing 10 grams per litre of the styryl dyestuff 1-(4'-phenoxy - 3' - sulphophenyl) - 3 - heptadecyl - 4 - p - di - (ethylcarboxymethyl - amino - benzylidene-5-pyrazolone sodium salt, derived from the insoluble aldehyde p - di - (ethyl - carboxymethyl)-amino-benzaldehyde and 5 grams per litre of the styryl dyestuff 1-(4'-phenoxy-3'-sulphophenyl) - 3 - heptadecyl - 4 - p - di - (carboxyethyl) - amino - benzylidene - 5 - pyrazolone sodium salt, derived from the soluble aldehyde p - ($\beta:\beta'$ - dicarboxydiethylamino) - benzaldehyde. This layer serves as a yellow filter layer, and provides the magenta colour forming components and also the yellow masking dyestuff. Finally as the top layer there is coated a blue sensitive gelatino-silver halide emulsion containing 10 grams per litre of p-stearylamino-benzoylacetanilide-p'-carboxylic acid sodium salt (the yellow colour forming component described in Example 3 of British specification No. 486,848). The film is exposed to the light from a coloured object, developed in a developer solution of the composition used in Example 1, washed, bleached with a solution of the composition used in Example 1, washed, fixed with sodium thiosulphate, and then treated with a 1% solution of sodium nitrite. This treatment with sodium nitrite regenerates the styryl dyestuff derived from the insoluble aldehyde but not that from the soluble aldehyde, since the anil formed from the soluble aldehyde and the amine of the developer solution has been removed during the processing and washing steps.

The processed material contains in the first layer a cyan dyestuff negative image, in the second layer a magenta dyestuff negative image and a yellow styryl dyestuff positive image and in the top layer a yellow dyestuff negative image.

The negative transparency so obtained when used for printing gives similar results to those obtained with the negative transparencies made as described in Examples 1 and 2.

*Example 4*

In place of the magenta colour forming component of Example 1, there may be used 1 - (phenyl - 3' - methanesulphonic acid) - 3 - heptadecyl - 4 - p - $\beta:\beta'$ - dicyanodiethylaminobenzylidene-5-pyrazolone (sodium salt) or 1-(phenyl - 3' - carboxylic acid) - 3 - (4' - stearoyl - aminophenyl) - 4 - p - di - (ethylcarboxymethyl) - amino - benzylidene - 5 - pyrazolone (sodium salt).

*Example 5*

In place of the magenta colour forming component of Example 2 there may be used the dyestuff 1 - $\beta$ - octadecenyl - succinamido - 4 - omegacyano - omega - (p - N - methyl - N - $\beta$ - cyanoethyl - amino - benzylidene) - aceto - benzene (sodium salt).

*Example 6*

In place of the magenta colour forming component of Example 3 there may be used the dyestuffs 1 - phenyl - 3 - ($\beta$ - octadecenyl - succinylamino) - 4 - p - $\beta:\beta'$ - dicyanodiethylaminobenzylidene - 5 - pyrazolone (sodium salt) or 1 - p - cyanophenyl - 3 - ($\beta$ - octadecenyl - succinylamino) - 4 - p - N - $\beta$ - chloroethyl - N - methylamino - benzylidene - 5 - pyrazolone (sodium salt). These dyestuffs may be made by acylating 1-phenyl- or 1-cyanophenyl-3-amino-5-pyrazolone with octadecenylsuccinic anhydride and condensing the product with an anil of the appropriate substituted benzaldehyde.

What we claim is:

1. A process for producing color correction in an exposed photographic element including at least one light sensitive gelatino-silver halide emulsion layer containing therein a water-soluble yellow styryl dyestuff as a color former adapted to yield upon exposure and development a magenta colored image, said yellow styryl dyestuff having the general formula

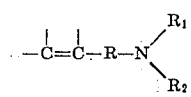

wherein R is a monocyclic aryl radical, the terminal carbon atom is selected from the group consisting of the omega-carbon atom of a cyano acetyl radical and a carbon atom forming a part of a pyrazolone nucleus, and $R_1$ and $R_2$ are alkyl radicals, at least one of which is substituted with a radical selected from the group consisting of cyano, alkylcarboxy, nitro, carboxy, sulfo, chloro, hydroxy and methoxy, said dyestuff further containing outside the said

grouping a substituent which renders the dyestuff fast to diffusion in gelatin emulsions and a substituent selected from the class consisting of sulfonic acid and carboxylic acid groups, said process comprising the steps of developing said exposed element with a primary aromatic amino developing agent to form the magenta colored image, and thereafter treating said element with a substance selected from the group consisting of formaldehyde and nitrites, said substance being capable of liberating the p-N-substituted-amino-benzaldehyde from the resulting p-N-substituted-amino-benzylidene derivative of the aromatic amine used as the color developer.

2. The process of claim 1 wherein the substance used for treating said element is formaldehyde.

3. The process of claim 1 wherein the substance used for treating said element is a nitrite.

4. The process of claim 3 wherein the nitrite is sodium nitrite.

5. The process of claim 1 wherein the element to be colour corrected is an exposed multi-layer element comprising differently sensitized gelatino-sliver halide emulsion layers containing colour former adapted to yield upon exposure and development, yellow, magenta and cyan coloured images in separate layers.

6. The process of claim 5 wherein the layer containing the yellow styryl dyestuff adapted to yield the magenta coloured image is positioned intermediate the other layers and also contains a yellow styryl filter dyestuff, said filter dyestuff having the general formula

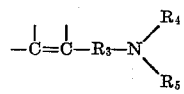

wherein the terminal carbon atom is selected from the group consisting of the omega-carbon atom of a cyano acetyl radical and a carbon atom forming a part of a pyrazolone nucleus and where $R_3$ is a monocyclic aryl radical, and $R_4$ and $R_5$ are alkyl radicals wherein one of $R_3$, $R_4$ and $R_5$ in all cases contains a member from the groups consisting of carboxyl and sulphonic acid groups in the case of $R_4$ and $R_5$ and a sulphonic acid group in the case of $R_3$.

7. The process of claim 1 wherein the

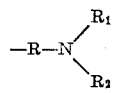

part of the molecule is free of water solubilizing groups.

8. The process of claim 1 wherein the substituent rendering the dyestuff fast to diffusion is an alkyl group having at least five carbon atoms.

9. The process of claim 1 wherein the substance used is an alkali metal nitrite.

References Cited in the file of this patent

UNITED STATES PATENTS

| Number | Name | Date |
| --- | --- | --- |
| 2,036,546 | Schneider | Apr. 7, 1936 |
| 2,186,731 | Schneider | Jan. 9, 1940 |
| 2,449,966 | Hanson | Sept. 21, 1948 |

FOREIGN PATENTS

| Number | Country | Date |
| --- | --- | --- |
| 513,596 | Great Britain | Oct. 17, 1939 |